United States Patent [19]
Hausermann et al.

[11] 3,777,595
[45] Dec. 11, 1973

[54] METHOD OF MAKING A MASTER DIE FOR USE IN AN ABRASION PROCESS

[76] Inventors: Elmer P. Hausermann, 4 N. 224 Hawthorne, Bensenville; Marten C. Hausermann, 131 S. Grant, Addison, both of Ill.

[22] Filed: July 19, 1971

[21] Appl. No.: 163,941

[52] U.S. Cl. .......... 76/107 R, 219/69 M, 219/69 V, 51/281 R, 51/58
[51] Int. Cl. ............................................. B21k 5/20
[58] Field of Search ................. 76/107 R; 219/69 R, 219/69 M, 70, 68, 69 V; 51/281 R, 58

[56] References Cited
UNITED STATES PATENTS
2,405,663   8/1946   Miller ............................... 219/69 R
2,854,560   9/1958   Hill ................................... 219/69 R
3,663,786   5/1972   O'Connor ........................... 219/68

FOREIGN PATENTS OR APPLICATIONS
1,163,999   2/1964   Germany ............................. 219/69

OTHER PUBLICATIONS
IBM Tech. Disc. Bulletin by Baumlin et al. Vol. 13, No. 3, 1970, August.

Primary Examiner—Charles W. Lanham
Assistant Examiner—D. C. Crane
Attorney—Roger A. Schmiege et al.

[57] ABSTRACT

A method of making an oversize negative master die or working tool with a roughened surface thereon from a positive model. The oversize negative master die is used in conjunction with automated apparatus to prepare identical duplicate electrical discharge machining electrodes of the same dimensions as the model.

6 Claims, 6 Drawing Figures

PATENTED DEC 11 1973　　3,777,595
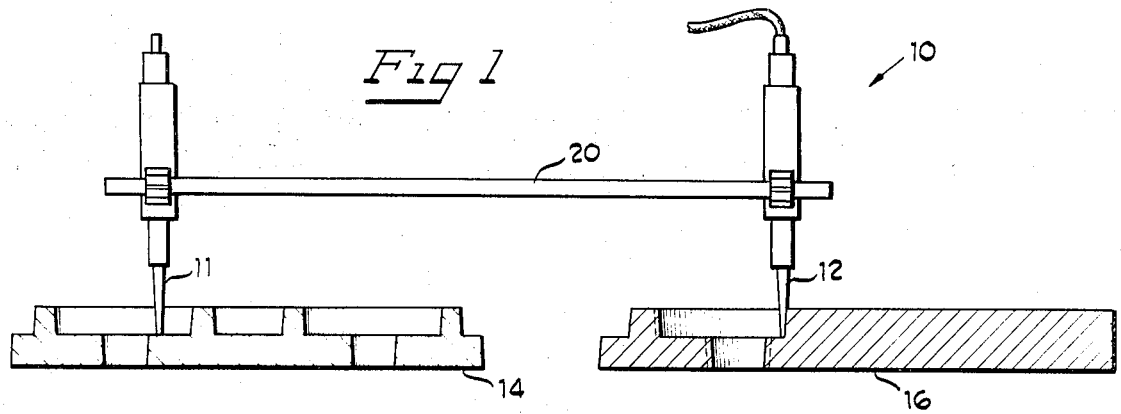
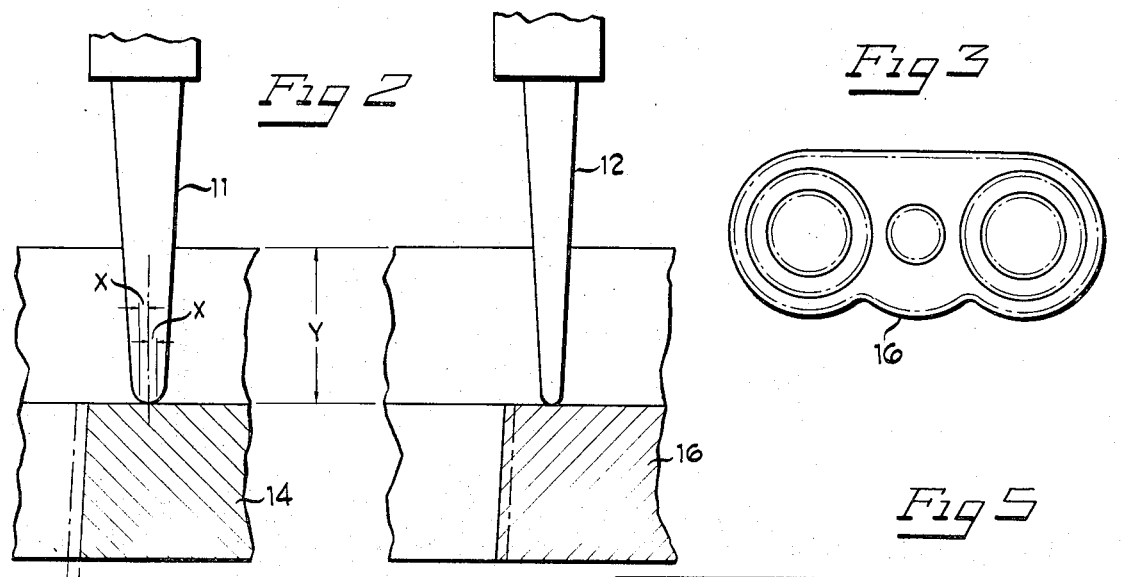
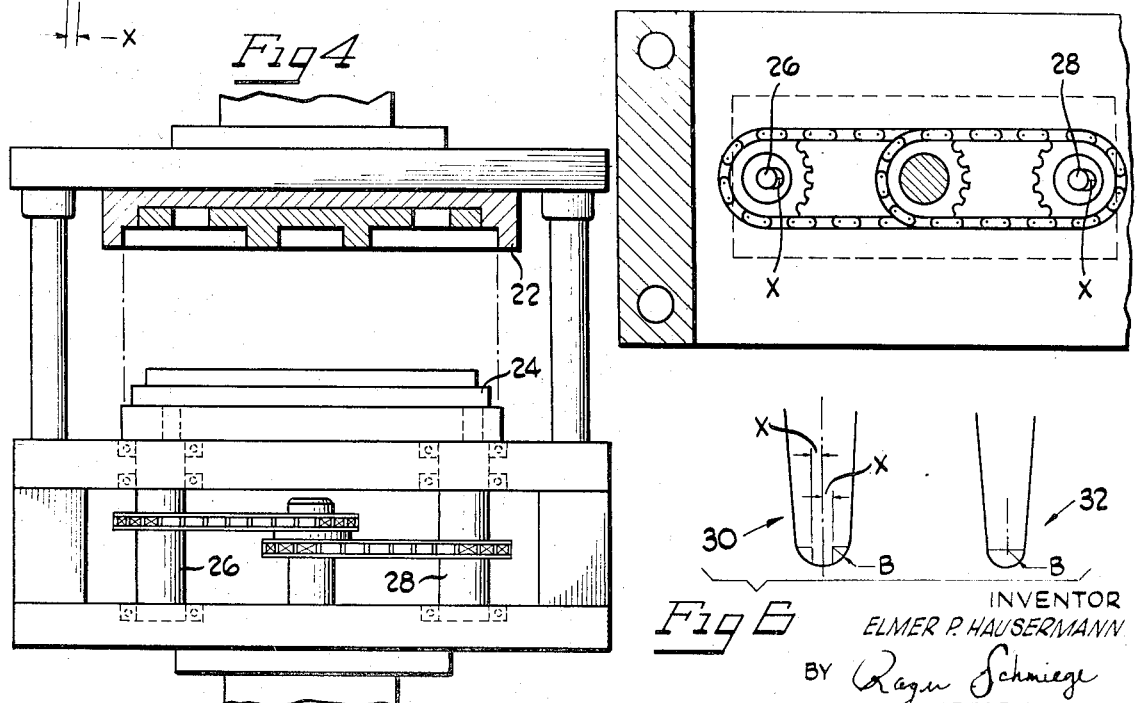
INVENTOR
ELMER P. HAUSERMANN
BY Ragu Schmiege
ATTORNEY

METHOD OF MAKING A MASTER DIE FOR USE IN AN ABRASION PROCESS

BACKGROUND OF THE INVENTION

Shaping apparatus and methods for making three dimensional electrodes for use in electrical discharge machining are known. The electrodes are used to sink dies and the like. Briefly described, the most efficient method and apparatus of shaping duplicate electrodes utilizes an oversize working tool or master die member. In this method, dulplicate electrodes are abraded from a workpiece by forcing the electrode workpiece member into the master die member. The working tool member is thus used to abrade and shape the electrodes from the electrode workpiece member. This method of shaping electrodes comprises the steps of mounting the electrode workpiece member and the oversize working tool or master die in the superposed relation to each other, applying circulatory translation to at least one of the members while simultaneously bringing the members into contact with each other. The oversize negative working tool serves to abrade the electrode workpiece member to a lesser size in the horizontal direction, namely the proper size and shape of a positive electrode for sinking a negative die cavity by electrical dishcarge machining. The oversize of the tool is determined by the distance the moving member travels from center in all directions through each circular translation. The object, of course, is to obtain three-dimensional electrodes of the same identical dimensions as the positive model initially provided, in order that the negative die cavity prepared by using the positive electrodes is as specified by the positive model.

It will be noted, from the description above, that a working tool or master die member is required in the method in order to abrade electrodes to the desired shape for use in EDM processes.

Prior to the instant invention, the master die member, i.e. oversize working tool member, was prepared either by (a) applying circular translation to a block of steel while sinking a cavity therein by electrical discharge machining or (b) the oversize working tool cavity was provided by displacing molding sand in a container while applying circular translation to the container to thereby provide an oversize cavity in the sand. The oversize cavity was used to produce an oversize casting which in turn was used to displace an abrasive-plastic composition and provide a master die cavity. Both of these methods are a part of the subject matter of previously filed patent applications of the inventor herein.

SUMMARY OF THE INVENTION

Briefly described, the present invention is directed to machining steps in a method of preparing a master die or working tool of oversize dimensions for use in preparing three-dimensional electrodes. In the method of the instant invention a model electrode is placed in a tracing and machining apparatus which apparatus is well known in the art. The apparatus is provided with stylus means for tracing the model, and cutter means for machining a workpiece, at a remote location, to the identical dimensions of the model affixed to the tracing member. In the method of the instant invention the stylus utilized has a diameter in excess of that of the cutting member by that amount desired to cut oversize in a horizontal direction with respect to the model. In accordance with the instant method the model is traced with the oversize stylus while simultaneously an electrode workpiece member is machined to oversize dimensions. By "oversize," it is meant oversize in two dimensions only and the depth will remain the same.

The present invention will be more fully understood in view of the following drawings in which:

FIG. 1 is a cross-sectional view of a tracing stylus in combination with a cutting member generally showing how an oversize stylus is used to machine an oversize electrode member;

FIG. 2 is an enlarged broken away cross-sectional view of the oversize stylus and cutting member shown in FIG. 1;

FIG. 3 is a top plan view of an oversize machined member capable of being used as an electrode to sink an oversize die cavity either in steel or as an enlarged model to displace a cavity in a plastic-abrasive composition;

FIG. 4 is an elevational view of an apparatus that may be used to apply circular translation to either the master die member i.e. working tool member or electrode workpiece member to form the electrode workpiece member to the desired shape of electrode for sinking dies, within the oversize master die member;

FIG. 5 is a top plan view showing the eccentric attachment of the mechanism of FIG. 4, used to apply circular translation to an electrode workpiece member.

FIG. 6 is a cross-sectional view of the oversize stylus of the instant invention compared to that stylus normally used in tracing for machining.

Referring now more particularly to FIG. 1, there is a machining and tracing mechanism generally designated as 10 which contains an oversize stylus member 111 and a cutting member 12 which are connected to a common control member 20. It will be noted that stylus 11 and cutter 12 are coordinated so as to move in a similar path with respect to each other. As the stylus moves over the model 14, the cutter member 12 moves in an identical fashion in a remote location over a machinable workpiece member 16. The member 16 may be any suitable material to form an electrode, i.e. such as copper, silver, graphite, etc., however, is preferably carbon or graphite due to its ease of machining. Alternatively, the material may be plastic or wood if it is to be used to displace a plastic composition to form a master die.

As is apparent in FIG. 1, the cutter will machine the workpiece in that configuration set forth in the drawings, leaving a portion of the workpiece in the vertical plane, i.e. that portion set forth in dotted outlines, in workpiece 16. The amount left along each edge of the cavity and shown in broken outline on member 16 is commensurate with the radius of oversize of the tip of the stylus 11. The broken outline portion is clearly set forth in FIG. 2 and labeled x. For example, if the oversize of the stylus is x radius, (see FIG. 2) the oversize on the walls of the die cavity will be x along all sides. The depth of the cavity Y (shown in FIG. 2) will remain the same because the stylus 11 is of the same length as the cutter 12 and for purposes of the method of the instant invention the expansion of the master die member is in the horizontal plane only.

As the workpiece is machined by cutting member 12, the workpiece member will be ultimately fabricated to an oversize positive member 16 such as shown in FIG. 3. The horizontal oversize of the machined member is such that the additional portion of the member along the edges labeled x is the horizontal oversize from the model 14 utilized. If the material is electrically conductive, it may be used in an electrical discharge machine to burn an oversize steel cavity to serve as a master die 22. As is understood in the art, one must compensate for overburn in electrical discharge machining processes. Alternatively, the member may be used as an oversize model 16 to displace a plastic abrasive composition as hereinafter described.

A master die 22 which is a cavity and the negative prepared from the oversize positive electrode 16 machined, as set forth above, is shown on the upper portion of the apparatus in FIG. 4 in superposed relation to an electrode workpiece member 24.

Alternatively, the oversize machined member 16, such as set forth in FIG. 3, may be placed in a plastic-abrasive composition and allowed to set and cure. The plastic-abrasive master die cavity prepared in this manner may be used as the master die negative 22 in FIG. 4.

In either instance described above, the master die 22 (negative) is utilized in automated apparatus to shape an electrode workpiece member to that positive form required for sinking die cavities in metal, e.g. for forging. The positive electrodes ultimately formed must be of substantially the same dimensions as the model used initially, as described above, to form the master die. The offset shown for offset shafts 26 and 28 in FIGS. 4 and 5 must be identical to x shown in FIGS. 1 through 3. In this manner, the apparatus of FIG. 4 will remove an amount x on an electrode workpiece member 24 to shape the electrode workpiece 24 into the same dimensions as model 14.

Though the apparatus in FIG. 4 illustrates the master die as an oversize by the outlined portion x situated on the upper member of the apparatus shown in FIG. 4, it will be understood by those skilled in the art that the placement of electrode workpiece member and master die member may be reversed, in which case the circular translation would be applied to the master die member rather than to the workpiece member as illustrated.

As is well known, when using automated apparatus, flushing must occur throughout the formation of the workpiece member. In view of this, it is more convenient and efficient to flush by pumping upwardly through the workpiece member rather than downwardly through the master die cavity. For the same reason, it is preferred to apply circular translation to the electrode workpiece member rather than to the master die member. It has been found that flushing with an alcohol-water combination is preferred due to the absence of residual oil or other deliterious substances that might interfere with electrical spark discharge after flushing has been accomplished. Also, ethyl alcohol is the preferred alcohol due to its lack of toxic effect on personnel during preparation of the electrode.

FIG. 5 shows the offset shafts 26 on the left and shafts 28 on the right with an offset of x, i.e., that amount of oversize of the stylus member 11 on any given side as shown in FIG. 1. FIG. 6 shows the oversize diameter stylus 30 on the left compared to a regular diameter stylus 32 on the right. The oversize is that amount of increased diameter over that of the cutter member required to provide the horizontal size increase in the machined member as above described. It is well known that in normal tracing and machining operations the stylus and the cutter are of equal diameter. It will be understood that the radius B of oversize stylus 30, at the tip thereof, is the same as radius B of a normal stylus or cutter 32. This is necessary because the shaping of the negative die cavity must be identical to the positive model and this is possible only if the radius of the stylus tip and the cutter tip coincide. The compensation for stylus deflection is not accounted for in the description of the radius above and if there is deflection, that amount must be accounted for as part of the radius of the stylus.

Modifications to the invention described above will become apparent to those skilled in the art without departing from the scope of the instant invention. For example, in many tracing apparatus, it is necessary to compensate for stylus movement or deflection which would of necessity prevent a direct ratio of cutter size to stylus size and in turn affect the amount of oversize x referred to herein. The scope of the invention is defined solely by the appended claims which should be construed as broadly as is consistent with the prior art.

We claim:

1. A method of making an oversize negative master die member from a positive model member, which negative die member is oversize in horizontal dimensions with respect to the positive model and may be used in automated electrode forming apparatus that applies circular translation to the master die member or to a workpiece member or both to thereby abrade a positive electrode member from the workpiece member within the master die member, said method comprising the steps of:

affixing an oversize stylus to a tracing member of a machining and tracing apparatus, said oversize stylus being oversize in diameter compared to the machining or cutting member thereof, placing the model member in said machining apparatus and tracing said model with said oversize stylus while simultaneously cutting and machining the workpiece member to an oversize machined member which is oversize with respect to the model in a horizontal direction only and is of the same depth as the model, utilizing the oversize machined member to prepare the said negative oversize master die member and applying circular translation of an amplitude equal to the oversize in stylus diameter utilizing automated electrode forming apparatus in conjunction with said master die so formed, to thereby form electrodes of the identical size as said model.

2. The method of claim one wherein the oversize machined workpiece member is composed of an electrically conductive composition and the negative master die member is a metal die prepared by electrical discharge machining using the oversize machined member as the electrode.

3. The method of claim two wherein the machined member is formed from graphite.

4. The method of claim one wherein the oversize machined member is placed in a plastic-abrasive composition, the composition is allowed to cure and the negative master die member is formed in the plastic-abrasive composition.

5. The method of claim one wherein the workpiece member is a nonconductive material such as plastic or wood.

6. The method of claim one wherein the workpiece member is an electrically conductive composition selected from the group consisting of graphite, copper, silver and similar materials.

* * * * *